(12) United States Patent
Davis (10) Patent No.: US 11,415,144 B2
(45) Date of Patent: Aug. 16, 2022

(54) COMPLIANT KEYWAY FOR AN ELECTRIC SUBMERSIBLE PUMP BEARING SLEEVE

(71) Applicant: HALLIBURTON ENERGY SERVICES, INC., Houston, TX (US)

(72) Inventor: Gregory Austin Davis, Broken Arrow, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 343 days.

(21) Appl. No.: 16/486,647

(22) PCT Filed: Apr. 30, 2018

(86) PCT No.: PCT/US2018/030305
§ 371 (c)(1),
(2) Date: Aug. 16, 2019

(87) PCT Pub. No.: WO2018/222321
PCT Pub. Date: Dec. 6, 2018

(65) Prior Publication Data
US 2020/0232473 A1 Jul. 23, 2020

Related U.S. Application Data

(60) Provisional application No. 62/514,597, filed on Jun. 2, 2017.

(51) Int. Cl.
*F04D 29/047* (2006.01)
*E21B 43/12* (2006.01)
(Continued)

(52) U.S. Cl.
CPC .......... *F04D 29/047* (2013.01); *E21B 43/128* (2013.01); *F04D 1/06* (2013.01);
(Continued)

(58) Field of Classification Search
CPC .. F04D 13/10; F04D 29/0413; F04D 29/0473; F04D 29/669; F04D 13/08;
(Continued)

(56) References Cited

U.S. PATENT DOCUMENTS 5,722,812 A * 3/1998 Knox ........................ F04D 1/06
415/199.1
6,210,103 B1 * 4/2001 Ramsay .............. F04D 29/0413
415/112

(Continued)

FOREIGN PATENT DOCUMENTS

EP   0079871 A1   5/1983
JP   07203658 A1   8/1995

OTHER PUBLICATIONS

International Search Report dated Aug. 13, 2018, issued in related PCT/US2018/030306.

*Primary Examiner* — Dominick L Plakkoottam
(74) *Attorney, Agent, or Firm* — McGuireWoods LLP (57) ABSTRACT

A compliant keyway for an electric submersible pump (ESP) bearing sleeve is described. A compliant keyway system for an ESP bearing sleeve includes the ESP bearing sleeve coupled to an ESP shaft by an elongate key such that the ESP bearing sleeve is rotatable with the ESP shaft, the ESP bearing sleeve inward of a non-rotatable bushing, the elongate key seated on a first elongate side within a shaft keyway extending longitudinally along the ESP shaft, and the elongate key seated on a second elongate side within a sleeve keyway, an inner diameter of the ESP bearing sleeve including the sleeve keyway extending along a length of the bearing sleeve, the sleeve keyway including a keyway means for compliance with deflection of the elongate key seated within the sleeve keyway, and the elongate key transferring torque between the ESP shaft and the ESP bearing sleeve.

10 Claims, 7 Drawing Sheets

(51) Int. Cl.
  *F04D 1/06* (2006.01)
  *F04D 13/10* (2006.01)
  *F04D 29/043* (2006.01)
  *H02K 5/132* (2006.01)

(52) U.S. Cl.
  CPC .......... *F04D 13/10* (2013.01); *F04D 29/043* (2013.01); *F05D 2260/36* (2013.01); *F16C 2360/44* (2013.01); *H02K 5/132* (2013.01)

(58) Field of Classification Search
  CPC . F04D 1/04; F04D 1/06; F04D 29/041; F04D 29/043; F04D 29/448; F04D 29/628
  See application file for complete search history.

(56) References Cited

U.S. PATENT DOCUMENTS

| | | | |
|---|---|---|---|
| 9,334,865 B2 * | 5/2016 | Johnson | F04D 29/0413 |
| 10,145,380 B1 * | 12/2018 | Davis | F04D 29/669 |
| 2003/0085815 A1 | 5/2003 | Tilton et al. | |
| 2012/0247832 A1 | 10/2012 | Cramer et al. | |
| 2015/0023815 A1 * | 1/2015 | Tetzlaff | F04D 29/0413 |
| | | | 417/365 |
| 2015/0071799 A1 * | 3/2015 | Johnson | F04D 29/0413 |
| | | | 417/423.3 |
| 2016/0115998 A1 * | 4/2016 | Jayaram | F04D 13/10 |
| | | | 417/423.3 |
| 2018/0045209 A1 * | 2/2018 | Nowitzki | F04D 13/10 |
| 2018/0195554 A1 * | 7/2018 | Parmeter | H02K 5/132 |

* cited by examiner

COMPLIANT KEYWAY FOR AN ELECTRIC SUBMERSIBLE PUMP BEARING SLEEVE

BACKGROUND

1. Field of the Invention

Embodiments of the invention described herein pertain to the field of bearing sleeves for electric submersible pumps. More particularly, but not by way of limitation, one or more embodiments of the invention enable a compliant keyway for an electric submersible pump bearing sleeve.

2. Description of the Related Art

Fluid, such as gas, oil or water, is often located in underground formations. When pressure within the well is not enough to force fluid out of the well, the fluid must be pumped to the surface so that it can be collected, separated, refined, distributed and/or sold. Centrifugal pumps are typically used in electric submersible pump (ESP) applications for lifting well fluid to the surface. Centrifugal pumps impart energy to a fluid by accelerating the fluid through a rotating impeller paired with a stationary diffuser, together referred to as a "stage." In multistage centrifugal pumps, multiple stages of impeller and diffuser pairs may be used to further increase the pressure lift. The stages are stacked in series around the pump's shaft, with each successive impeller sifting on a diffuser of the previous stage. The pump shaft extends longitudinally through the center of the stacked stages. The shaft rotates, and the impeller is keyed to the shaft causing the impeller to rotate with the shaft.

Conventional ESP assemblies sometimes include bearing sets to carry radial and thrust forces acting on the pump during operation. A bearing set traditionally consists of a sleeve and bushing. The sleeve is keyed to the shaft and rotates with the shaft. The key that transmits torque between the shaft and the sleeve fits inside opposing keyways that run along the length of the shaft and the length of the sleeve, respectively. The bushing is pressed into the diffuser around the sleeve and should not rotate. In order to combat abrasion, the rotatable sleeve and bushing of the bearing set are conventionally made of tungsten carbide or a tungsten carbide cobalt composite. The tungsten carbide is a hard, brittle material. The hardened sleeve and bushing is often referred to in the ESP industry as abrasion resistant trim, or "AR trim."

The key that secures the sleeve to the ESP shaft is conventionally a skinny, long rectangular strip about 36 inches in length and made of treated steel or an austenite alloy. ESP keys are typically softer and more ductile than the hardened sleeves they operate to turn, and therefore the keys are simple to fabricate and permit the key to withstand shaft twist. Conventional ESP shafts experience twisting along their length as a motor on one end of the long, thin shaft attempts to turn the entire shaft from below. The attached key twists along with the shaft, and a typical set of these long, skinny keys may twist an entire revolution around the shaft over the length of the pump.

Figure 1:
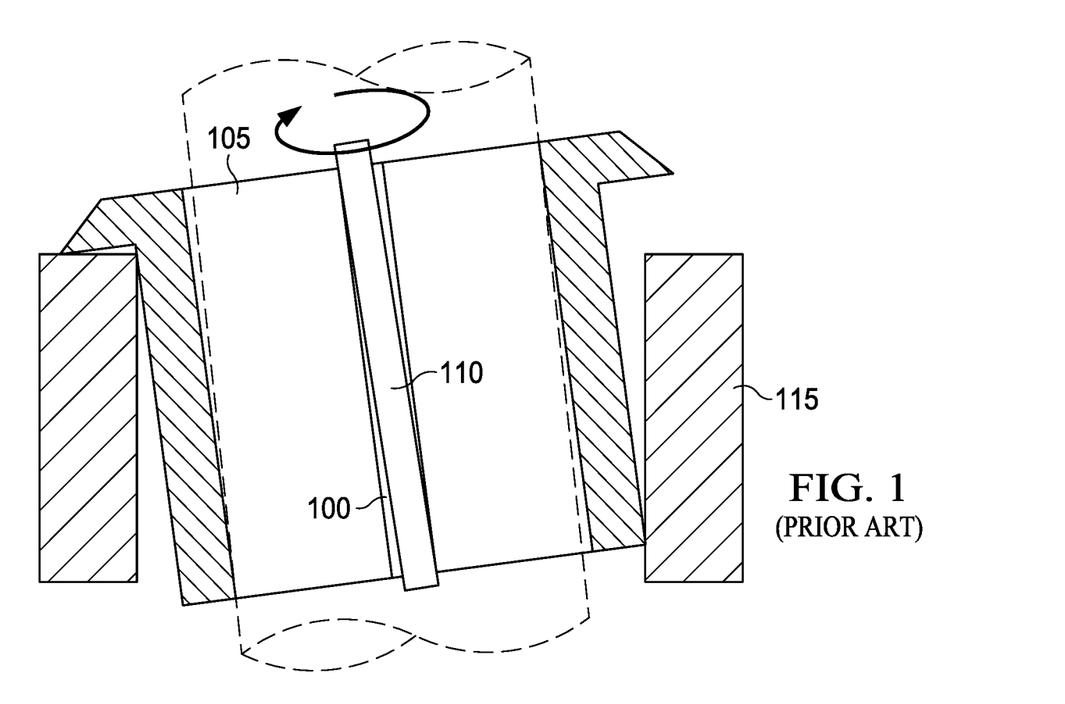
FIG. 1 is a cross sectional view of a conventional bearing set of the prior art.

As shown in FIG. 1, conventional sleeve keyway 100 is traditionally a rectangular indentation extending along the length of the inner diameter of conventional sleeve 105. Pressure exerted by the twisting conventional key 110 seated in the conventional sleeve keyway 100 causes point loading on the edges of conventional sleeve keyway 100, and leads to conventional sleeve 105 tilting with respect to conventional bushing 115. Conventional bushing 115 is held straight by virtue of its interference fit inside the diffuser, but shaft twist causes conventional sleeve 105 to lean in response to the twisting conventional key 110. The result is overloading damage to the tilted conventional sleeve 105 where it contacts conventional bushing 115, since thrust forces are distributed over a smaller area. The damage is most severe on the bottom of the thrust face of the flange of the sleeve, particularly in stages closer to the ESP motor where the shaft twist is most significant and therefore the tilting effect is greater, thus reducing the effective thrust distribution area. This type of bearing overload will eventually cause failure of the sleeve and an inability of the bearing set to carry thrust, which can lead to pump failure.

As is apparent from the above, currently available electric submersible pump bearings suffer detrimental effects due to keyway point-loading caused by shaft twist and sleeve misalignment. Therefore, there is a need for a compliant keyway in electric submersible pump bearing sleeves.

SUMMARY

One or more illustrative embodiments enable a compliant keyway for an electric submersible pump (ESP) bearing sleeve.

A compliant keyway for an electric submersible pump (ESP) bearing sleeve is described. An illustrative embodiment of a compliant keyway system for an ESP bearing sleeve includes the ESP bearing sleeve coupled to an ESP shaft by an elongate key such that the ESP bearing sleeve is rotatable with the ESP shaft, the ESP bearing sleeve inward of a non-rotatable bushing, the elongate key seated on a first elongate side such as first elongate side 317 of FIG. 3 within a shaft keyway such as shaft keyway 404 of FIG. 7 extending longitudinally along the ESP shaft, and the elongate key seated on a second elongate side such as first elongate side 319 of FIG. 3 within a sleeve keyway, an inner diameter of the ESP bearing sleeve including the sleeve keyway extending along a length of the bearing sleeve, the sleeve keyway including a keyway means for compliance with deflection of the elongate key seated within the sleeve keyway, and the elongate key transferring torque between the ESP shaft and the ESP bearing sleeve. In some embodiments, the keyway means for compliance with deflection of the elongate key includes a flared keyway, the flared keyway including a driving side edge opposing a trailing side edge, the driving side edge including a lower portion angled away from the trailing side edge and downwards, and the trailing side edge including an upper portion angled away from the driving side edge and upwards. In certain embodiments, an upper portion of the driving side edge extends longitudinally, and a lower portion of the trailing side edge extends longitudinally. In some embodiments, the upper portion of the driving side edge intersects the lower portion of the driving side edge at a waist of the ESP bearing sleeve, the upper portion of the trailing side edge intersects the lower portion of the trailing side edge at the waist, the upper portion of the driving side edge is parallel to the lower portion of the trailing side edge, and the lower portion of the driving side edge is parallel to the upper portion of the trailing side edge. In certain embodiments, the keyway means for compliance with deflection of the elongate key includes a swivel carriage, the swivel carriage including a carriage frame surrounding three sides of the elongate key, and a pin pivotally coupling the carriage to the ESP bearing sleeve. In certain embodiments, the keyway means for compliance with deflection of the elongate key further includes at least two spring members, a first spring member extending between the driving side edge of the sleeve keyway and the carriage frame and a second spring member extending between a trailing side edge of the sleeve keyway and the carriage frame. In some embodiments, the first spring member engages the lower portion of the driving side edge of the flared keyway, and the second spring member engages the upper portion of the trailing side edge of the flared keyway. In certain embodiments, the keyway means for compliance with deflection of the elongate key includes the sleeve keyway askew from a longitudinal axis of the ESP bearing sleeve and including a driving side edge parallel to a trailing side edge, wherein each of the driving side edge and trailing side edge of the sleeve keyway includes a notch proximate each end, a first leaf spring engaged within the notches proximate each end of the driving side edge, and a second leaf spring engaged within the notches proximate each end of the trailing side edge, and the elongate key pivotably supported between the first leaf spring and the second leaf spring. In some embodiments, the sleeve keyway slants upwards angling towards a trailing side of the ESP bearing sleeve. In certain embodiments, the keyway means for compliance with deflection of the elongate key includes a first buffer lining extending between a trailing side edge of the sleeve keyway and the seated elongate key and a second buffer lining extending between a driving side edge of the sleeve keyway and the seated elongate key. In some embodiments, the first buffer lining and the second buffer lining comprise an elastomer, and the first buffer lining extends along a length of the driving side edge and the second buffer lining extends along a length of the trailing side edge. In certain embodiments, the keyway means for compliance with deflection of the elongate key includes a first paddle extending along a driving side of the elongate key and a first spring member extending between the first paddle and a driving side edge of the sleeve keyway, and a second paddle extending along a trailing side of the elongate key and a second spring member extending between the second paddle and a trailing side edge of the sleeve keyway. In some embodiments, the first paddle includes a first ball secured within a first socket proximate a top of the driving side edge of the sleeve keyway, the first paddle pivotable about a first joint formed by the first ball and the first socket, and the second paddle includes a second ball secured within a second socket proximate a bottom of the trailing side edge of sleeve keyway, the second paddle pivotable about a second joint formed by the first ball in the first socket, and wherein the sleeve keyway slants along the inner diameter of the ESP bearing sleeve upwards towards a trailing side of the inner diameter. In some embodiments, the ESP bearing sleeve includes a flange around a top of the ESP bearing sleeve, the flange extending over the non-rotatable bushing, the bushing press-fit to a centrifugal pump diffuser.

An illustrative embodiment of an electric submersible pump (ESP) flanged thrust bearing sleeve includes a sleeve keyway, the sleeve keyway configured to be compliant in response to misalignment of a torque transmitting key from a longitudinal axis of the flanged thrust bearing sleeve; and the torque transmitting key seated within the sleeve keyway on a first elongate side of the torque transmitting key and a keyway of a rotatable shaft of an ESP on a second elongate side of the torque transmitting key.

An illustrative embodiment of a compliant keyway system for an electric submersible pump (ESP) bearing sleeve includes the ESP bearing sleeve coupled to an ESP shaft by an elongate key such that the ESP bearing sleeve is rotatable with the ESP shaft, the ESP bearing sleeve inward of a non-rotatable bushing, the elongate key seated on a first elongate side within a shaft keyway extending longitudinally along the ESP shaft, and the elongate key seated on a second elongate side within a sleeve keyway, an inner diameter of the ESP bearing sleeve including the sleeve keyway extending along a length of the bearing sleeve, the sleeve keyway including a trailing side edge and a driving side edge, a first spring member extending between the trailing side edge of the sleeve keyway and the elongate key, a second spring member extending between the driving side edge of the sleeve keyway and the elongate key, and the elongate key transferring torque between the ESP shaft and the ESP bearing sleeve. In some embodiments, the first spring member and the second spring member include leaf springs. In certain embodiments, the first spring member and the second spring member include elastomeric buffer layers. In some embodiments, the first spring member and the second spring member include paddles. In some embodiments, the first spring member and the second spring member include helical coil springs.

In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings in which.

While the invention is susceptible to various modifications and alternative forms, specific embodiments thereof are shown by way of example in the drawings and may herein be described in detail. The drawings may not be to scale. It should be understood, however, that the embodiments described herein and shown in the drawings are not intended to limit the invention to the particular form disclosed, but on the contrary, the intention is to cover all modifications, equivalents and alternatives falling within the scope of the present invention as defined by the appended claims.

DETAILED DESCRIPTION

A compliant keyway for an electric submersible pump (ESP) bearing sleeve is described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

As used in this specification and the appended claims, the singular forms "a", "an" and "the" include plural referents unless the context clearly dictates otherwise. Thus, for example, reference to a "spring" includes one or more springs.

"Coupled" refers to either a direct connection or an indirect connection (e.g., at least one intervening connection) between one or more objects or components. The phrase "directly attached" means a direct connection between objects or components.

As used herein, the "top" of an element refers to the downstream-most side of the element, without regard to whether the ESP operates or is configured to operate in a horizontal, vertical or angled direction and/or extends through a radius.

As used herein, "bottom" of an element refers to the upstream-most side of the element, without regard to whether the ESP operates or is configured to operate in a horizontal, vertical or angled direction and/or extends through a radius.

In the art, "outer diameter" and "outer circumference" are sometimes used equivalently. As used herein, the outer diameter is used to describe what might otherwise be called the outer circumference or outer surface of a substantially tubular component such as a bearing sleeve.

In the art, "inner diameter" and "inner circumference" are sometimes used equivalently. As used herein, the inner diameter is used to describe what might otherwise be called the inner circumference or inner surface of a substantially tubular component such as a bearing sleeve.

Illustrative embodiments may permit a rotating flanged sleeve to run true to its mated bushing while distributing loads evenly on the sleeve keyway and thrust face of the sleeve. Illustrative embodiments may eliminate or reduce point loading on a keyway of an ESP bearing sleeve and may prevent or reduce misalignment of the sleeve, thereby eliminating offset torque. Illustrative embodiments may reduce heat checking, increase load ratings and/or prevent keyway deformation from propagating into a break. Illustrative embodiments may improve the effectiveness and lifetime of ESP thrust and/or radial bearing sets and may thus extend the operational life of an ESP centrifugal pump assembly employing illustrative embodiments.

The inventor has observed that conventional flanged sleeves experience concentrated heat checking in a position 90° offset from the sleeve's keyway groove, measured in the direction of rotation. The inventor thus recognized a relationship between particular point loaded locations along the sleeve keyway and overloading damage to the bearings. Illustrative embodiments may provide a novel solution to overload damage by removing point loading of the keyway groove at the lower driving side and the upper trailing side of the sleeve keyway, which may eliminate offset torque and allow the thrust face of the sleeve to run true and parallel to the surrounding bushing.

Illustrative embodiments may include a compliant keyway. The compliant keyway may allow movement, such as deflection and/or twist, of an ESP shaft and torque-transmitting key without point-loading the keyway groove of the sleeve. Several means for a compliant keyway are described. A compliant keyway may include a flared keyway groove in a flanged sleeve of an abrasion resistant bearing set. The keyway groove may be flared at the top of the trailing side and at the bottom of the driving side of the keyway groove. A spring member may extend between the flared sides of the keyway and the key. In some embodiments, the keyway may be slanted across the inner surface of the sleeve. The top and bottom ends of both the trailing and driving side of the keyway groove may be notched, and a leaf spring may be secured within the notches on each side, with a key extending between the leaf springs when the sleeve is keyed to a shaft. In certain embodiments, a buffer material may be placed along the driving and trailing sides of the keyway, in between the key and the walls of the keyway in the sleeve. In some embodiments, a carriage and swivel pin may couple the sleeve to a key. In certain embodiments, pivotable paddles may be placed along the driving and trailing sides of the keyway.

The torque transmitting coupling system of illustrative embodiments may be employed in stages of an ESP assembly such as a multi-stage centrifugal pump, charge pump or gas separator. Illustrative embodiments may be particularly beneficial in stages closer to the ESP motor, where twisting of the long, thin shaft tends to be most severe. Illustrative embodiments are primarily described in terms of a flanged sleeve paired with a press-fit bearing. However, the invention is not so limited and may similarly be employed with radial sleeves and/or compliant bearings.

Figure 2:
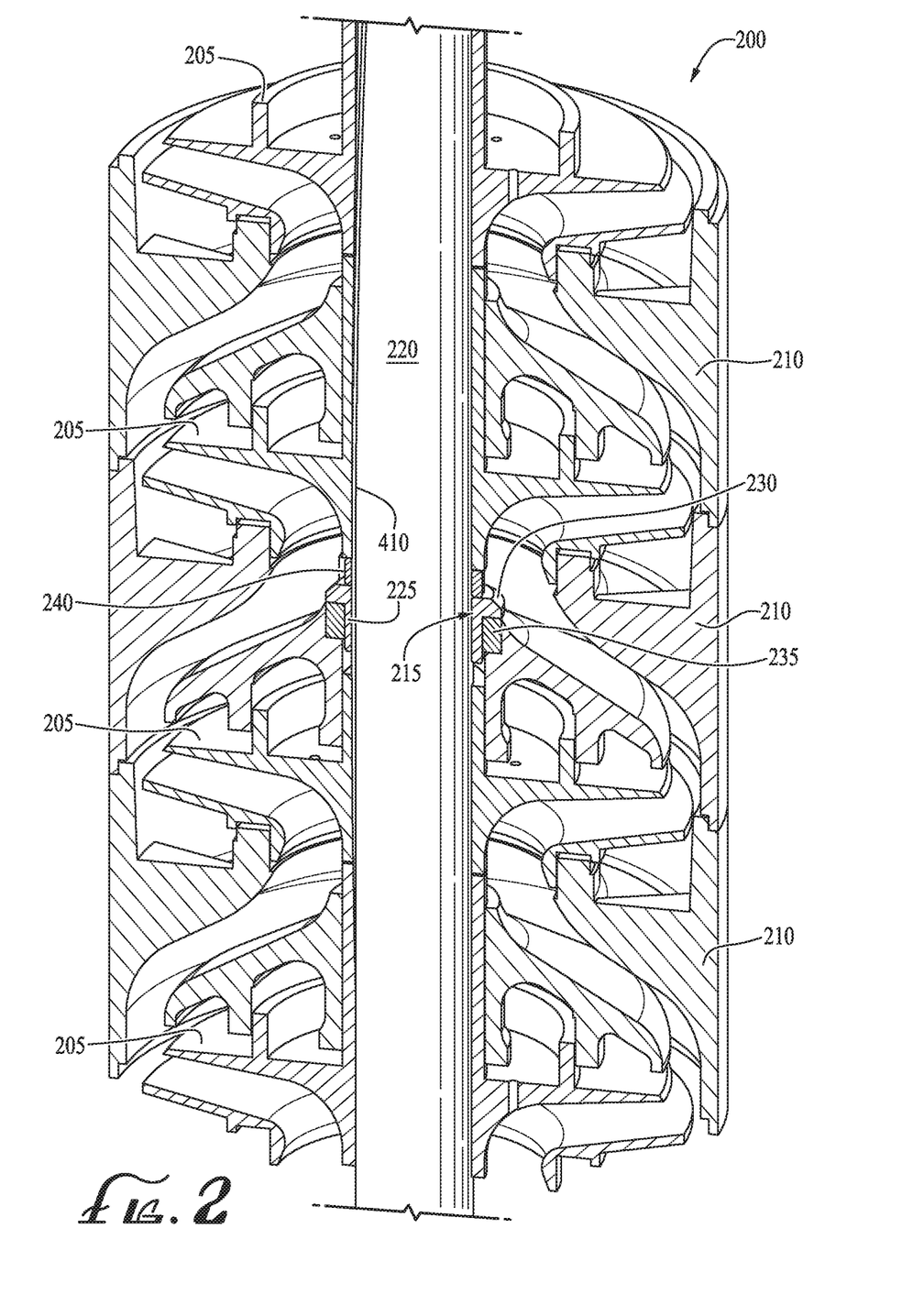
FIG. 2 is a cross sectional view of a multi-stage centrifugal pump including an exemplary bearing sleeve having a compliant keyway of an illustrative embodiment.

The compliant keyway of illustrative embodiments may be included on an inside diameter of a bearing sleeve and facilitate keyed torque transfer from a rotatable ESP shaft to the sleeve. FIG. 2 illustrates a multi-stage centrifugal pump having a sleeve with a complaint keyway of illustrative embodiments. Centrifugal pump 200 may include stages of impeller 205 and diffuser 210 pairs stacked around shaft 220. Shaft 220 may for example be made of a nickel-copper alloy known as Monel (a registered trademark of Huntington Alloys Corporation of W. Va., United States), an austenitic nickel-chromium-based superalloy known as Inconel (a registered trademark of Huntington Alloys Corporation), or another similar material. Sleeve 215 may rotate with shaft 220 inside non-rotatable bushing 235. Sleeve 215 may include body 225, which may be a tube or hollow cylinder, and flange 230 may extend around sleeve body 225 and outward over the top of bushing 235. Body 225 may provide radial support to shaft 220, and flange 230 may provide thrust support to pump 200. Several sleeves 215 may be included on a single shaft 220 and spaced at intervals along shaft 220 as needed for thrust and/or radial support. In the embodiment shown in FIG. 2, standoff sleeve 240 is keyed to shaft 220 above sleeve 215 and may determine the running height of the impeller 205 above sleeve 215. In downhole and/or ESP embodiments, pump stages may be encased in a housing that separates the pump 200 from a casing annulus, production tubing may be connected above pump 200 to carry lifted fluid to the surface of a well or other collection location, and a motor, seal section and/or pump intake may be attached below pump 200.

Key 410 may transfer torque between shaft 220 and the other rotatable pump components of pump 200 such as one or more of bearing sleeve 215, standoff sleeve 240 and/or impellers 205. Key 410 may twist as it extends along the length of shaft, for example key 410 may twist up to a full revolution around shaft 220 over the length of pump 200. A sleeve keyway of illustrative embodiments may allow key 410 to seat within sleeve 215 and transfer torque from shaft 220 to sleeve 215 while providing uniform load distribution across the compliant keyway of illustrative embodiments.

Flared Compliant Keyway

Figure 3:
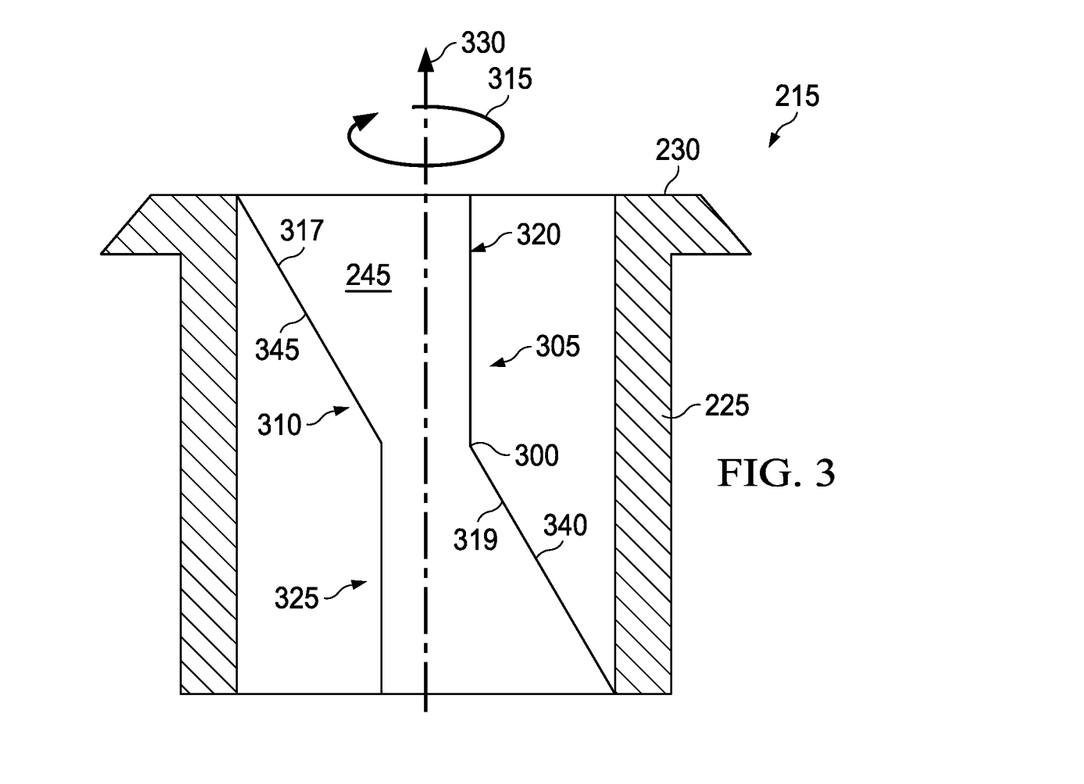
FIG. 3 is a cross sectional view of an exemplary sleeve having a flared compliant keyway of an illustrative embodiment.

Illustrative embodiments may include a flared and/or tapered keyway extending along the length of an inner diameter of rotatable sleeve 215. Torque-transmitting key 410 may be seated within the flared keyway, and the torque-transmitting key 410 may connect the sleeve 215 to shaft 220 such that sleeve 215 rotates with shaft 220. The keyway may be flared at the bottom of the driving side and at the top of the trailing side to form a cockeyed hourglass shape. The novel keyway shape may assist in relieving point loads on the sleeve keyway of illustrative embodiments.

FIG. 3 shows an exemplary sleeve having a flared keyway of an illustrative embodiment. Keyway 245 may extend the entire length and/or substantially the entire length of sleeve 215 and include waist 300, which waist 300 may be a narrow and/or cinched portion at and/or proximate the middle of keyway 245 in an axial direction. Waist 300 may be about the width of a conventional keyway that would conventionally be employed with key 410. Waist 300 may divide keyway 245 into top and bottom portions. Keyway 245 may include driving side 305 and trailing side 310. Driving side 305 and trailing side 310 may be determined by the direction of rotation of sleeve 215. In the embodiment illustrated in FIG. 3, sleeve 215 rotates in clockwise direction 315 about longitudinal axis 330. In the instance the direction of rotation of sleeve 215 is counterclockwise, a mirror image about longitudinal axis 330 of the flare described herein should be employed. Top driving portion 320 and lower trailing portion 325 of keyway 245 may remain un-tapered and/or parallel to longitudinal axis 330 when sleeve 215 runs true. Lower driving portion 340 and top trailing portion 345 may be flared and/or angled outward so as to widen keyway 245 as it extends away from waist 310. Lower driving portion 340 and/or top trailing portion 345 may be angled at 2°, 5° degrees or another similar angle from longitudinal axis 330 to produce keyway 245 having a flared shape. The angle of lower driving portion 340 and top trailing portion 345 of keyway 245 may depend on the degree of shaft twist experienced across sleeve 215, which may be determined by the location of sleeve 215 along shaft 220 and/or the size, horsepower and/or material of shaft 220. For example, sleeves 215 keyed to shafts 220 of smaller radius and higher horsepower may require a larger angling of lower driving portion 340 and top trailing portion 345 from longitudinal axis 330 than sleeves 215 keyed to shafts 220 having relatively larger radius and lower horsepower. In another example, sleeves 215 closer to the motor operating to turn shaft 220 may experience greater shaft twist and associated tilt than sleeves 215 further from the motor and therefore require greater angling of lower driving portion 340 and top trailing portion 345.

When key 410 is seated within complaint keyway 245, the portion of key 410 passing through the top of sleeve 215 may shift towards top trailing portion 345 and the portion of key 410 passing through the bottom of sleeve 215 may shift towards lower driving portion 340, which may allow key 410 to twist and/or deflect from longitudinal axis 330 without point loading keyway 245 or causing misalignment of sleeve 215 with respect to mated bushing 235.

Swivel Carriage Compliant Keyway

Figure 4A:
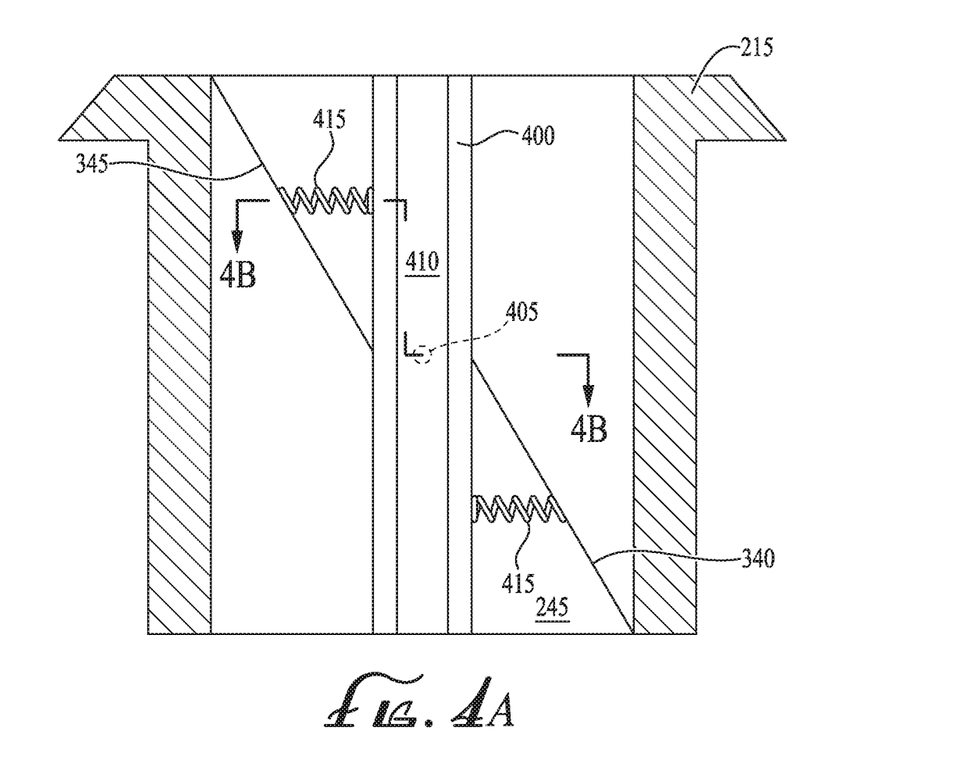
FIG. 4A is a cross sectional view of an exemplary sleeve having a swivel carriage compliant keyway of an illustrative embodiment.
Figure 4B:
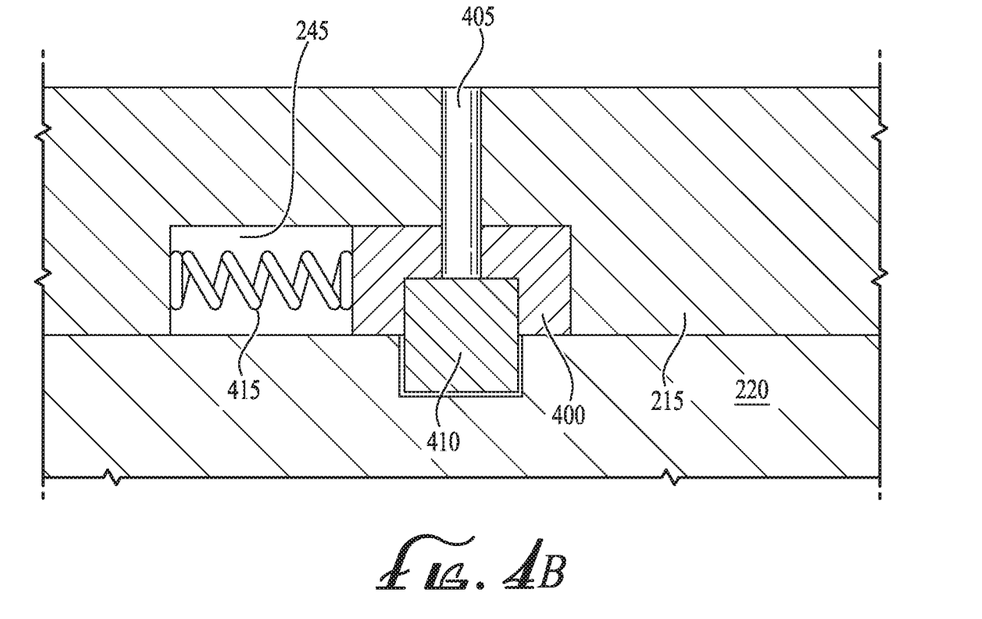
FIG. 4B is a cross sectional view across line 4B-4B of FIG. 4A of a swivel carriage compliant keyway of an illustrative embodiment.

A flared keyway 245 of illustrative embodiments may include a suspension system for key 410 seated within the keyway 245. The suspension system of illustrative embodiments may provide flexibility, deformation capability and/or compliance as pressure is placed on sleeve keyway 245 due to key 410 deflection and/or twist while providing uniform load distribution across keyway 245. An exemplary key suspension system may include a swivel carriage. FIG. 4A and FIG. 4B illustrate a swivel carriage means for a compliant keyway of an illustrative embodiment. Key 410 may be surrounded, enclosed and/or contacted on three sides by carriage 400: the side of key 410 facing sleeve 215 and the two adjacent sides. Carriage 400 may be a square or rectangular tube cut in half lengthwise, half of an I-beam and/or have a profile like a squared bridge with its legs resting on shaft 220. Carriage 400 may extend over key 410 like a jacket for the duration of the length of sleeve 215.

Pin 405 may secure sleeve 215 to carriage 400. Pin 405 may extend through sleeve 215 and carriage 400 proximate and/or at waist 300 of keyway 245. Pin 405 may be a pivot, allowing carriage 400 to rotate about pin 405 with respect to sleeve 215. When installed, carriage 400 may closely fit against the wall of keyway 245 at top driving portion 330 and lower trailing portion 335 of keyway 245. Where keyway 245 widens at lower driving portion 340 and top trailing portion 345, spring members 415 may extend between carriage 400 and the wall of keyway 245. As key 410 deflects towards top trailing portion 345 and lower driving portion 340, carriage 400, pin 405 and spring members 415 may create compliance within keyway 245 that absorbs force from deflecting key 410 and counteracts point loads. The swivel carriage system of illustrative embodiments may distribute loads evenly across keyway 245 despite shaft twist.

Carriage 400 may assist assembly of the suspension system of illustrative embodiments by allowing spring members 415 to be inserted within keyway 245 prior to sliding of sleeve 215 over a key 410 that is coupled to shaft 220. Spring member 415 may be a helical compression spring, coil spring, conical spring, disc or Belleville spring, and/or another similar type of spring. Ends of spring members 415 may be secured into opposing apertures in wall of keyway 245 and carriage 400 respectively. When sleeve 215 is assembled onto shaft 220, carriage 400 may slide over key 410, with pin 405 holding carriage 400 in place on sleeve 215.

Angled Compliant Keyway

Figure 5A:
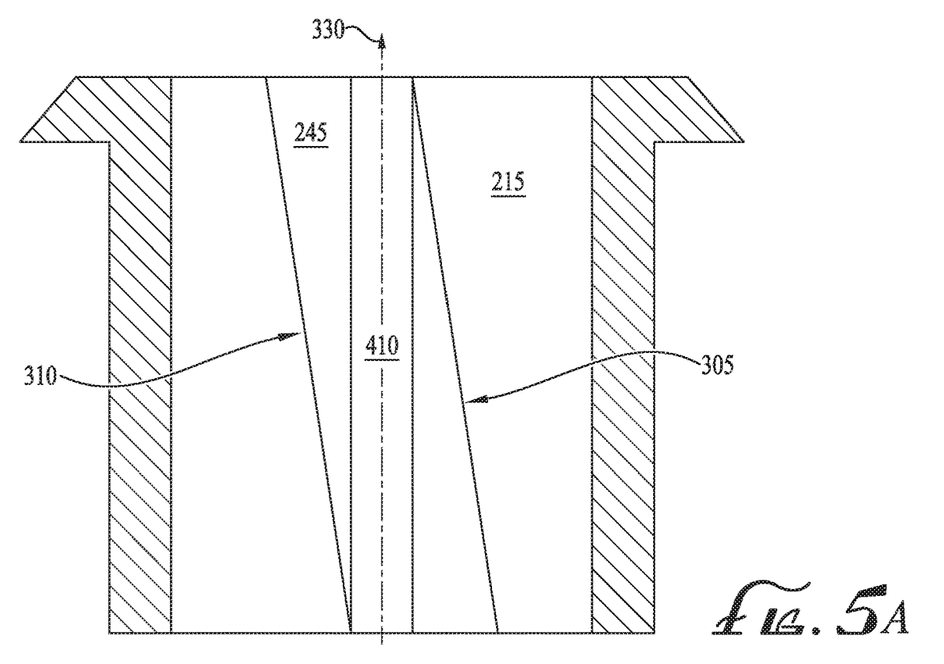
FIG. 5A is a cross sectional view of an exemplary sleeve having an angled compliant keyway of an illustrative embodiment with an undeflected key.
Figure 5B:
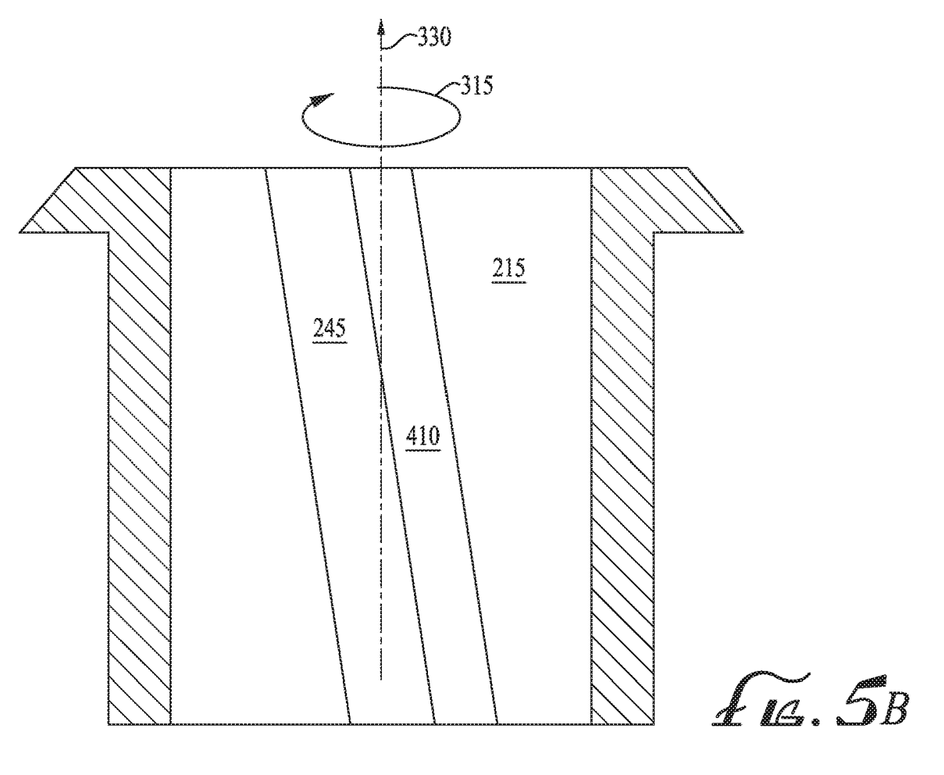
FIG. 5B is a cross sectional view of an exemplary sleeve having an angled compliant keyway of an illustrative embodiment with a deflected key.

Illustrative embodiments may include an angled keyway 245 on an inner diameter of rotatable sleeve 215. In contrast to a flared keyway, angled keyway 245 may be of uniform width across the length of keyway 245 and may be angled away from longitudinal axis 330. The width of keyway 245 may remain uniform as keyway 245 extends along the length of sleeve 215. FIGS. 5A-5B illustrate an angled keyway 245 of an illustrative embodiment. In angled embodiments, keyway 245 may be angled towards trailing side 310 as keyway 245 extends upwards along sleeve 215. While undeflected and/or during installation of sleeve 215 onto shaft 220, key 410 may extend longitudinally and/or true to longitudinal axis 330 as key 410 extends through angled keyway 245, as shown in FIG. 5A. Angled keyway 245 may have a width and/or angle such that during installation, sleeve 215 may slide over and mate with undeflected key 410 despite the slant of keyway 245. In an un-deflected position, key 410 may contact only the top of driving side 305 and the bottom of trailing side 310 of keyway 245. During instances of shaft 220 twist and/or key 410 deflection, key 410 may tilt inside angled keyway 245 to match the angle of keyway 245 and/or such that the length of key 410 within keyway 245 rests against driving side 305, as shown in FIG. 5B. As a result, key 410 may twist while seated within keyway 245 without point loading keyway 245 and/or without causing misalignment of sleeve 215 with respect to mated bushing 235.

Keyway 245 may be angled at 2°, 5° degrees or another similar angle from longitudinal axis 330. The angle of keyway 245 may depend on the degree of shaft twist experienced across sleeve 215, which may be determined by the location of sleeve 215 along shaft 220 and/or the size, horsepower and/or material of shaft 220. For example, sleeves 215 keyed to shafts 220 of smaller radius and higher horsepower may require a larger angling of keyway 245 from longitudinal axis 330 as compared to sleeves 215 keyed to shafts 220 having relatively larger radius and lower horsepower. In another example, sleeves 215 closer to the motor operating to turn shaft 220 may experience greater shaft twist and associated tilt than sleeves 215 further from the motor and therefore may require greater angling of keyway 245 from longitudinal axis 330 as keyway 245 extends across the inner diameter of sleeve 215.

Buffer-Lined Compliant Keyway

Figure 6:
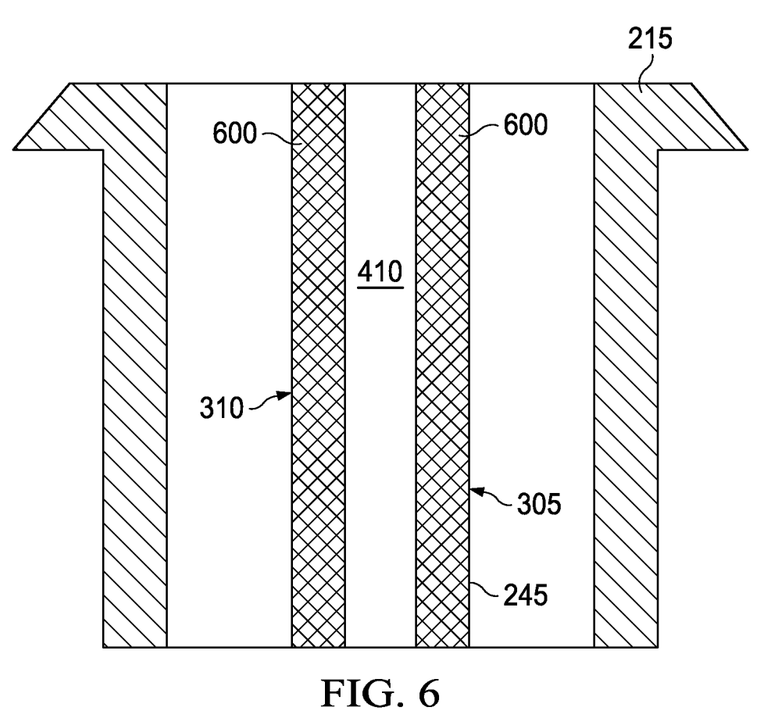
FIG. 6 is a cross sectional view of an exemplary sleeve having a buffer-lined compliant keyway of an illustrative embodiment.

Illustrative embodiments may include a buffer-lined means for a complaint keyway 245. The buffer-lined keyway of illustrative embodiments may provide flexibility and/or counteract force applied to keyway 245 as a result of point deflection. FIG. 6 illustrates a buffer-lined compliant keyway 245 of an illustrative embodiment. One or more buffer layers 600 may line the inside of both driving side 305 and trailing side 310 of keyway 245 and/or the inside of keyway 245, and may extend the length of keyway 245 across sleeve 215. Keyway 245 may be wider than key 410 so as to accommodate key 410 as well as the width of buffer layers 600 on both driving side 305 and trailing side 310. In buffer layer 600 embodiments, keyway 245 may not be flared and/or may not be angled where the thickness of buffer layers 600 is constant across keyway 245. Where keyway 245 is flared, the thickness of buffer layers 600 may be increased at the bottom of driving side 305 and the top trailing side 310. In some embodiments, buffer layer 600 may be thinner or omitted at keyway 245 locations where point loading is not expected or unlikely to occur. Buffer layers 600 may be composed of an elastomeric material, for example ethylene propylene diene monomer (EPDM), Buna-N, Viton (a registered trademark of E.I. Du Pont De Nemours and Company), Aflas (a registered trademark of Asahi Glass Company, Ltd. Corporation), and/or another material having similar flexibility and/or compliance properties at ESP operating temperatures. Buffer layers 600 may deform and/or provide flexibility when pressure is applied as a result of key deflection and/or shaft twist, and may prevent point loading and/or sleeve 215 misalignment while providing a uniform load distribution on keyway 245.

Figure 7:
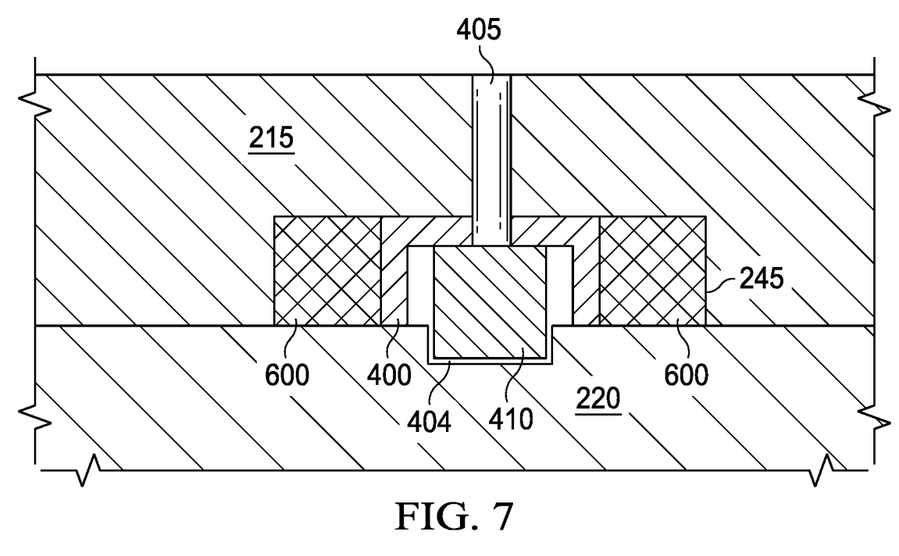
FIG. 7 is a cross sectional view of an exemplary sleeve having buffer-lined swivel carriage compliant keyway of an illustrative embodiment.

In some embodiments, a swivel carriage may be included with buffer-lined keyway 245. FIG. 7 illustrates a buffer-lined keyway 245 of an illustrative embodiment including swivel carriage 400. Carriage 400 may be seated within and/or between buffer layers 600. Carriage 400 may be coupled to sleeve 215 by pin 405, allowing carriage 400 to swivel and/or pivot as key 410 deflects and/or twists inside keyway 245. In contrast to the swivel carriage 400 of FIG. 4B, in the embodiment of FIG. 7 buffer layer 600 may replace spring member 415. Carriage 400 may fit inside and/or between opposing buffer layers 600 and may assist in holding buffer layers 600 in place during assembly. When sleeve 215 is installed, carriage 400 may slide over key 410 such that key 410 seats inside carriage 400. Pin 405 may secure carriage 400 to sleeve 215 and may provide a pivot point about which key 410 and carriage 400 may swivel within keyway 245.

Leaf Spring Compliant Keyway

Figure 8A:
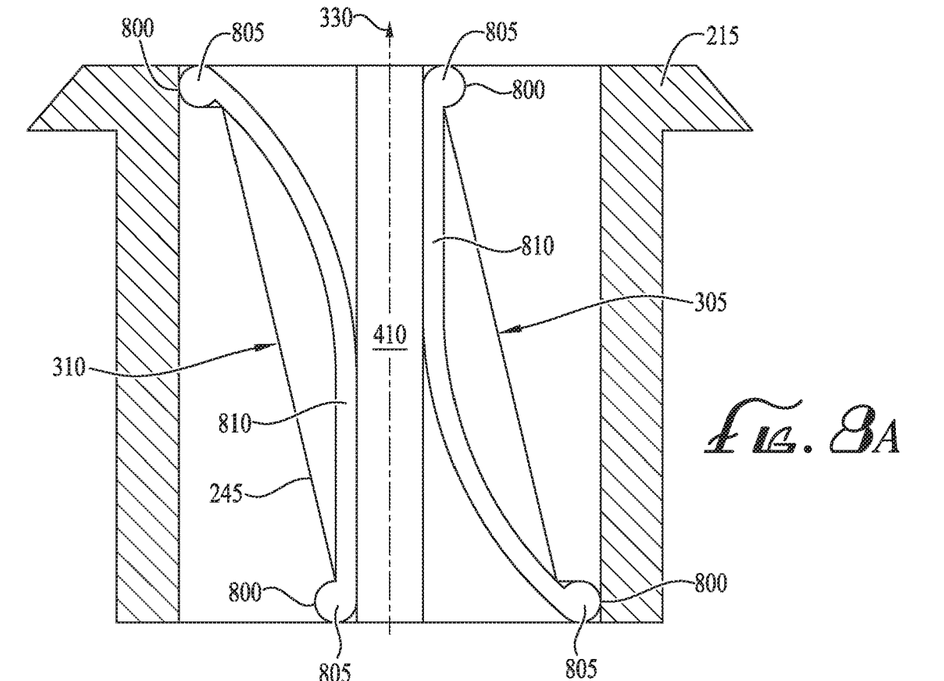
FIG. 8A a cross sectional view of an exemplary sleeve having a leaf spring compliant keyway of an illustrative embodiment with an undeflected key.
Figure 8B:
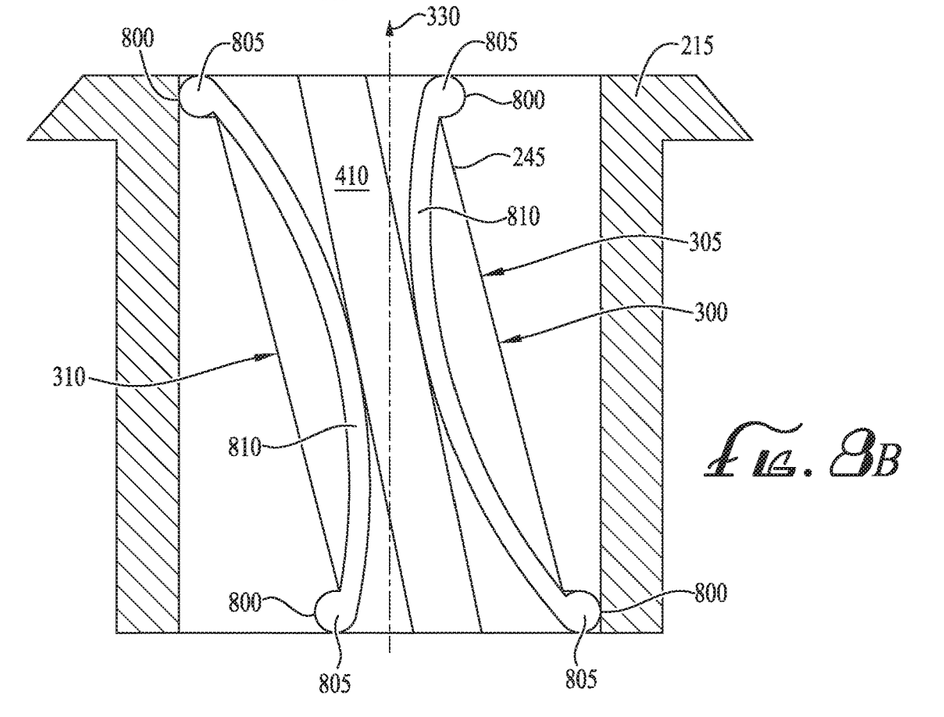
FIG. 8B a cross sectional view of an exemplary sleeve having a leaf spring compliant keyway of an illustrative embodiment with a deflected key.

Illustrative embodiments may include a leaf spring compliant keyway for key 410 that transmits torque between shaft 220 and rotatable sleeve 215. The leaf spring system of illustrative embodiments may provide uniform load distribution and compliance as uneven pressure is placed on sleeve 215 due to twisting and/or deflection of shaft 220 and/or key 410 misalignment. FIGS. 8A-8B illustrate a leaf spring compliant keyway 245 of an illustrative embodiment. Keyway 245 extending across inner diameter of sleeve 215 may be angled toward trailing side 310 as keyway 245 extends upwards along sleeve 215. The width and/or angle of keyway 245 may be constant across the surface of sleeve 215 and may allow sleeve 215 to slide over key 410 while key 410 is aligned with longitudinal axis 330, for example during installation of sleeve 215 on shaft 220 and/or in instances where key 410 does not experience deflection.

A pair of leaf springs 810 may flexibly support key 410 within keyway 245. A first leaf spring 810 may extend the length of trailing side 310, and a second leaf spring 810 may extend the length of driving side 305. Keyway 245 may include notches 800 at, near and/or proximate the top and bottom of both driving side 305 and trailing side 310. Notches 800 may extend outward from key 410. Similarly, the top and bottom of trailing side 310 may include trailing side notches 800. A first leaf spring 810 may secured along driving side 305 with spring ends 805 seated in driving side notches 800. Similarly, a second leaf spring 810 may be secured along trailing side 310 with spring ends 805 of second leaf spring 810 seated inside notches 800 proximate, at and/or near the top and bottom of trailing side 310 of keyway 245. Both leaf springs 810 may extend the length of keyway 245 and may curve inward toward one another and/or the center of keyway 245 to form a spring-like support system for key 410 cradled between leaf springs 810.

FIG. 8A illustrates an undeflected key 410 and/or the position of key 410 prior to rotation of shaft 220. Key 410 may sit parallel to longitudinal axis 330 inside keyway 245 and may contact an upper portion of leaf spring 810 on driving side 305 and a lower portion of leaf spring 810 on trailing side 310 of keyway 245. As key 410 deflects in response to shaft 220 twist and/or shaft deflection, the top of key 410 may slant and/or press towards upper portion 345 of trailing side 310 and/or the bottom of key 410 may slant and/or press towards lower portion 340 of driving side 305, resulting in the position shown in FIG. 8B. During tilt of key 410, leaf springs 810 may deform and contact key 410 near waist 300 of keyway 245. As a result, leaf springs 810 may provide a compliant keyway 245 for key 410 by deforming to resist point loads, which may provide a uniform load on key 410 and/or keyway 245 while transmitting torque from shaft 220 to sleeve 215.

Paddle Compliant Keyway

Figure 9A:
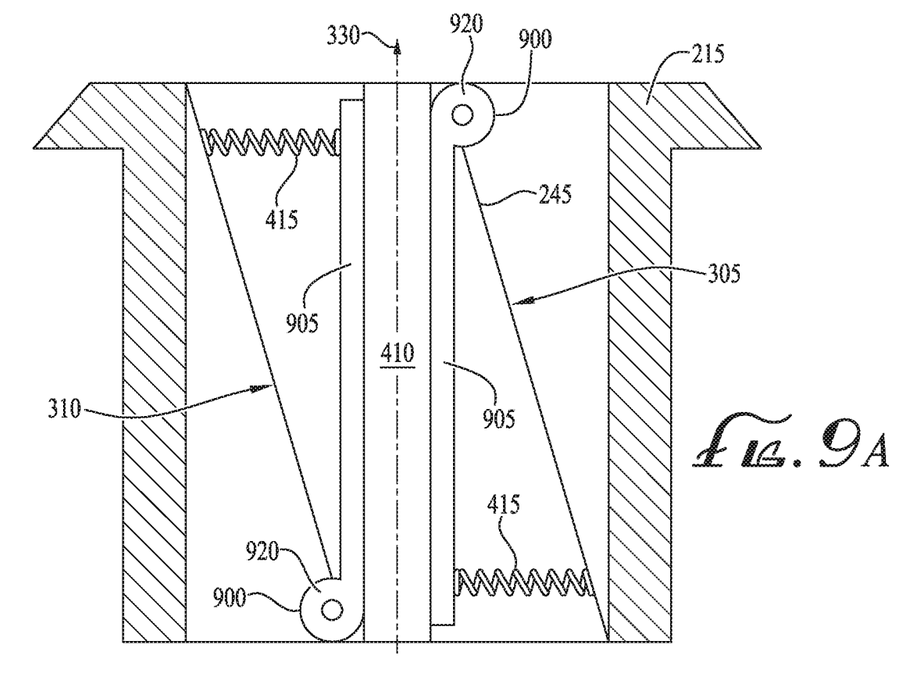
FIG. 9A is a cross sectional view of an exemplary sleeve having a paddle compliant keyway of an illustrative embodiment with an undeflected key.
Figure 9B:
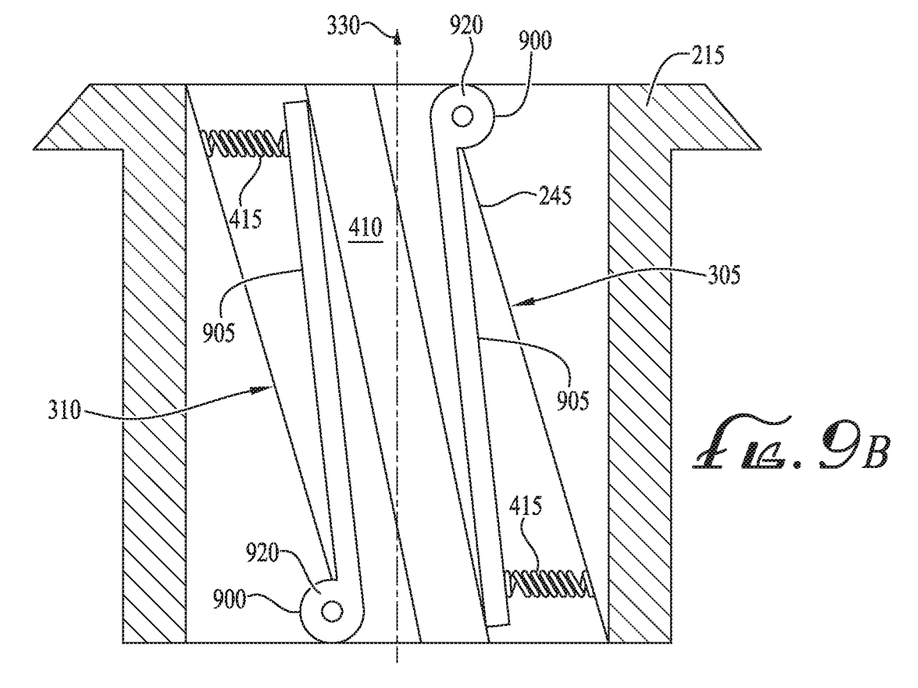
FIG. 9B is a cross sectional view of an exemplary sleeve having a paddle compliant keyway of an illustrative embodiment with a deflected key.

Illustrative embodiments may include a paddle means for a compliant keyway 245 for key 410 that transmits torque between shaft 220 and a rotatable bearing such as sleeve 215. The paddle system of illustrative embodiments may provide uniform load on keyway 245, which may allow sleeve 215 to run true to bushing 235 despite shaft 220 twist or deflection. FIG. 9A and FIG. 9B illustrate a paddled keyway 245 of an illustrative embodiment. Keyway 245 may be angled such that keyway 245 slants upwards towards trailing side 310. Keyway 245 may include a first socket 900 at, proximate and/or near the top of driving side 305, and a second socket 900 at, proximate or near the bottom of trailing side 310. Sockets 900 may be female receptors that mate with ball 920 of paddle 905. As shown in FIG. 9A, a pair of paddles 905 may extend parallel to longitudinal axis 330 (longitudinally) when key 410 does not experience deflection, with one paddle 905 extending along each of the driving side 305 and trailing side 310 of key 410. Each paddle 905 may pivot about the joint formed by ball 920 and socket 900. When seated inside keyway 245, key 410 may extend longitudinally between the paddles 905 in contact with the inside surface of the paddles 905. A first spring member 415 may extend between the top portion 345 of the trailing side 310 of keyway 245 and paddle 905 on trailing side of key 410. A second spring member 415 may extend between the lower portion 340 of driving side 305 of the wall of keyway 245 and paddle 905 on the driving side of key 410. As shown in FIG. 9B, as the top portion of key 410 attempts to deflect towards the top portion 345 of trailing side 310 of keyway 245 and/or the bottom portion of key 410 attempts to deflect towards the lower portion 340 of driving side 305 of keyway 245, ball 920 may pivot in socket 900 as spring member 415 contracts under pressure from paddle 905. Paddles 905 and spring members 415 may distribute loads from key 410 evenly across keyway 245, which may create a compliant keyway 245 that flexes, deforms and/or complies with uneven pressure on key 410, which may counteract point loads and hold sleeve 215 true to bushing 235.

Various means for a compliant keyway 245 for an ESP rotatable sleeve 215 have been described, including a flared keyway, an angled keyway, a swivel carriage keyway, a buffer-lined keyway, a leaf spring keyway and/or a paddle keyway. Various features from each of the compliant keyway means may be used individually or in combination. The compliant keyway 245 of illustrative embodiments may allow torque to transfer from shaft 220 to sleeve 215 while providing uniform load distribution across keyway 245, which may assist in holding sleeve 215 true to bushing 235 and may reduce heat checking.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the scope and range of equivalents as described in the following claims. In addition, it is to be understood that features described herein independently may, in certain embodiments, be combined.

The invention claimed is:

1. A compliant keyway system for an electric submersible pump (ESP) bearing sleeve comprising:
   the ESP bearing sleeve coupled to an ESP shaft by an elongate key such that the ESP bearing sleeve is rotatable with the ESP shaft, the ESP bearing sleeve inward of a non-rotatable bushing;
   the elongate key seated on a first elongate side within a shaft keyway extending longitudinally along the ESP shaft, and the elongate key seated on a second elongate side within a sleeve keyway;
   an inner diameter of the ESP bearing sleeve comprising the sleeve keyway extending along a length of the bearing sleeve, the sleeve keyway comprising a keyway means for compliance with deflection of the elongate key seated within the sleeve keyway; and the elongate key transferring torque between the ESP shaft and the ESP bearing sleeve,
   wherein the keyway means for compliance with deflection of the elongate key comprises a flared keyway, the flared keyway comprising: a driving side edge opposing a trailing side edge;
   the driving side edge comprising a lower portion angled away from the trailing side edge and downwards;
   and the trailing side edge comprising an upper portion angled away from the driving side edge and upwards.

2. The compliant keyway system of claim 1, wherein an upper portion of the driving side edge extends longitudinally, and a lower portion of the trailing side edge extends longitudinally.

3. The compliant keyway system of claim 2, wherein the upper portion of the driving side edge intersects the lower portion of the driving side edge at a waist of the ESP bearing sleeve, the upper portion of the trailing side edge intersects the lower portion of the trailing side edge at the waist, the upper portion of the driving side edge is parallel to the lower portion of the trailing side edge, and the lower portion of the driving side edge is parallel to the upper portion of the trailing side edge.

4. The compliant keyway system of claim 1, wherein the keyway means for compliance with deflection of the elongate key comprises a swivel carriage, the swivel carriage comprising: a carriage frame surrounding three sides of the elongate key; and a pin pivotally coupling the carriage to the ESP bearing sleeve.

5. The compliant keyway system of claim 4, wherein the keyway means for compliance with deflection of the elongate key further comprises at least two spring members, a first spring member extending between the driving side edge of the sleeve keyway and the carriage frame and a second spring member extending between a trailing side edge of the sleeve keyway and the carriage frame.

6. The compliant keyway system of claim 5, wherein the first spring member engages the lower portion of the driving side edge of the flared keyway, and the second spring member engages the upper portion of the trailing side edge of the flared keyway.

7. The compliant keyway system of claim 1, wherein the ESP bearing sleeve comprises a flange around a top of the ESP bearing sleeve, the flange extending over the non-rotatable bushing, the bushing press-fit to a centrifugal pump diffuser.

8. An electric submersible pump (ESP) flanged thrust bearing sleeve comprising:
   a sleeve keyway, the sleeve keyway configured to be compliant in response to misalignment of a torque transmitting key from a longitudinal axis of the flanged thrust bearing sleeve,
   the sleeve keyway comprising a flared keyway, the flared keyway comprising:
      a driving side edge opposing a trailing side edge;
      the driving side edge comprising a lower portion angled away from the trailing side edge and downwards;
      and the trailing side edge comprising an upper portion angled away from the driving side edge and upwards; and
   the torque transmitting key seated within the sleeve keyway on a first elongate side of the torque transmitting key and a keyway of a rotatable shaft of an ESP on a second elongate side of the torque transmitting key.

9. A compliant keyway system for an electric submersible pump (ESP) bearing sleeve comprising:
   the ESP bearing sleeve coupled to an ESP shaft by an elongate key such that the ESP bearing sleeve is rotatable with the ESP shaft, the ESP bearing sleeve inward of a non-rotatable bushing;
   the elongate key seated on a first elongate side within a shaft keyway extending longitudinally along the ESP shaft, and the elongate key seated on a second elongate side within a sleeve keyway;
   an inner diameter of the ESP bearing sleeve comprising the sleeve keyway extending along a length of the bearing sleeve, the sleeve keyway comprising:
   a flared keyway, the flared keyway comprising:
      a trailing side edge and a driving side edge opposing the trailing side edge,
      the driving side edge comprising a lower portion angled away from the trailing side edge and downwards;
      and the trailing side edge comprising an upper portion angled away from the driving side edge and upwards;
      a first spring member extending between the trailing side edge of the sleeve keyway and the elongate key;
      a second spring member extending between the driving side edge of the sleeve keyway and the
      elongate key; and
      the elongate key transferring torque between the ESP shaft and the ESP bearing sleeve.

10. The compliant keyway system of claim 9, wherein the first spring member and the second spring member comprise helical coil springs.

* * * * *